United States Patent [19]

Ono et al.

[11] Patent Number: 5,326,866
[45] Date of Patent: Jul. 5, 1994

[54] LIQUID AZO DYE AND INK COMPOSITION CONTAINING THE SAME

[75] Inventors: Takashi Ono, Takatsuki; Tatsuya Yagyu, Neyagawa; Tetsui Akase, Moriguchi, all of Japan

[73] Assignee: Orient Chemical Industries, Ltd., Osaka, Japan

[21] Appl. No.: 59,666

[22] Filed: May 12, 1993

[30] Foreign Application Priority Data

May 14, 1992 [JP] Japan ................................. 4-121882

[51] Int. Cl.$^5$ ...................... C09B 29/15; C09B 29/46; C09D 11/02; C09D 11/18
[52] U.S. Cl. ................................. 534/792; 534/827; 534/874; 8/506; 8/938; 106/20 D; 106/22 K
[58] Field of Search ....................... 534/792, 827, 874; 8/506, 938; 106/20 D, 22 K

[56] References Cited

U.S. PATENT DOCUMENTS 4,666,519  5/1987  Akiyama et al. ................. 106/22 K

OTHER PUBLICATIONS

Ono et al, *Chemical Abstracts*, vol. 109, No. 130818c (1988).

Primary Examiner—Mary C. Lee
Assistant Examiner—Fiona Powers
Attorney, Agent, or Firm—Birch, Stewart, Kolasch & Birch

[57] ABSTRACT

A liquid azo dye represented by the formula:

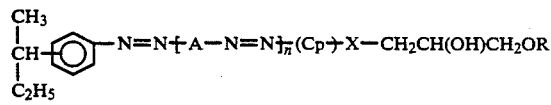

(wherein, A stands for a phenylene group which may have a substituent, n is o or 1, Cp is a pyrazolone derivative residue or a naphthol derivative residue, X is —NH— or —COO— and R is an alkyl group having 3 to 12 carbon atoms).

5 Claims, 5 Drawing Sheets

LIQUID AZO DYE AND INK COMPOSITION CONTAINING THE SAME

FIELD OF THE INVENTION

The present invention relates to a liquid dye which is used for writing ink, recording ink, stamping ink and the like. In particular, it relates to an azo type liquid dye having good solubility with organic solvents such as alcohols and glycols and an ink composition containing the same.

BACKGROUND OF THE INVENTION

Conventionally, as ink used for writing and recording on a material to be recorded, such as paper, or for ink-jet printing, various dyes or pigments which are dissolved or dispersed in liquid medium or binder have been used.

The ink obtained by dispersing organic pigment in a solvent has advantage in excellent fastness such as light fastness. However, the pigment in this ink deposits or agglomerates with time and special treatment in dispersion process is therefore necessary.

Oil ink obtained by dissolving a dye in an organic solvent (e.g. hydrocarbons) is more profitable as it does not require such troublesome dispersion process. In this ink, however, it has recently been desired that the organic solvent is changed to alcohols or glycols which are low toxicity to human body and therefore the dye has excellent solubility with alcohol.

As the dyes which satisfy such demand as much as possible, there are known various alcohol soluble dyes, for instance, a salt of basic dye and acid dye, a basic dye treated by fatty acid etc., a metal complex dye having a water soluble group such as a sulfonic group or an acid dye treated by an organic amine. However, the oil ink using the above listed alcohol soluble dyes (for instance, amine salt dye of acid yellow 23, 42; acid red 73, 180; direct blue 87; acid black 52 or salt-forming dye using basic dye such as auramine, rhodamine, victoria blue, methyl violet, etc.) are not satisfactory in regard to stability of ink and fastness of written image (light fastness, water resistance etc.), resulting in that the dye deposits with time or the ink increases viscosity when environmental conditions such as temperature and humidity change.

SUMMARY OF THE INVENTION

The present invention has been made in view of the above situation and the first objective of the present invention is to provide a liquid azo dye having excellent solubility with organic solvents, especially alcohols and glycols.

The second objective of the present invention is to provide a dye composition and an ink composition using alcoholic solvent, which has stability with time and stability with change of environment such as temperature and humidity.

The present inventors have found that liquid azo dyes obtained by introducing sec-butylphenyl azo group and glycidyl ether reaction residue into the structure of the dyes have a highly preferred alcohol solubility and exhibit excellent effect as coloring agent of oil ink used for a writing pen such as a ball-point pen or a marking pen and thus accomplished the present invention.

The present invention provides a liquid azo dye represented by the formula:

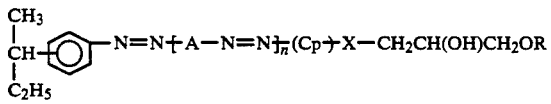

(wherein, A stands for a phenylene group which may have a substituent, n is o or 1, Cp is a pyrazolone derivative residue or a naphthol derivative residue, X is —NH— or —COO— and R is an alkyl group having 3 to 12 carbon atoms).

The present invention also provides a dye composition and an ink composition containing the above liquid azo dye.

DETAILED DESCRIPTION OF THE INVENTION

The present invention provides in particular the liquid azo dyes represented by the following formulae 1–4:

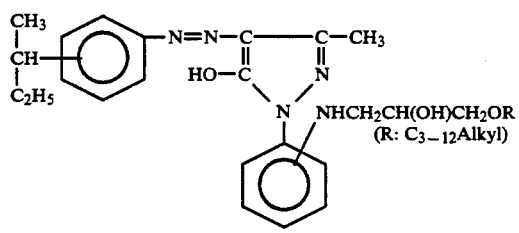

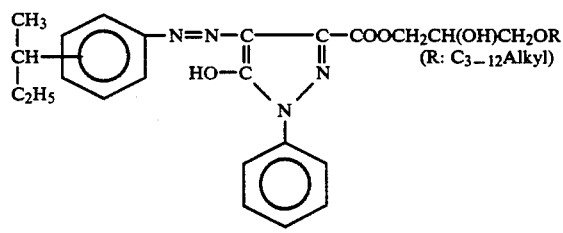

-continued

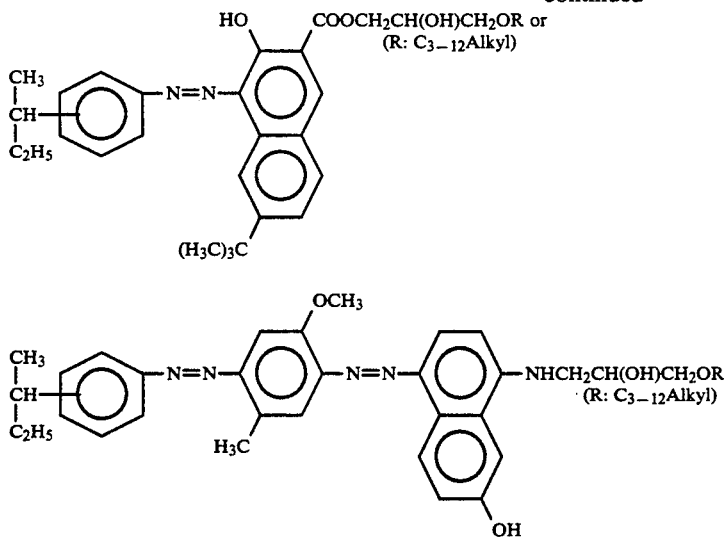

The first liquid azo dye of the present invention is obtained by diazotizing sec-butylaniline and coupling it with the following coupler (i):

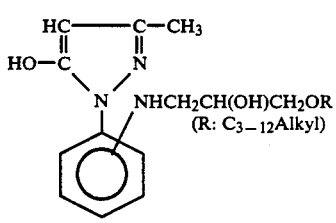

The second liquid azo dye of the present invention is obtained by diazotizing sec-butyl aniline and coupling it with the following coupler (ii):

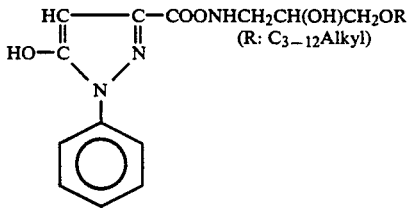

The third liquid azo dye of the present invention is obtained by diazotizing sec-butylaniline and coupling it with the following coupler (iii):

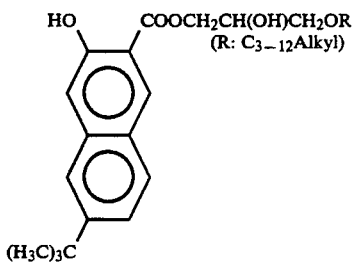

The fourth liquid azo dye of the present invention is obtained by diazotizing an aminoazo compound having the following structure which is obtained by diazotizing coupling of sec-butylaniline and p-cresidine (3-amino-4-methoxytoluene),

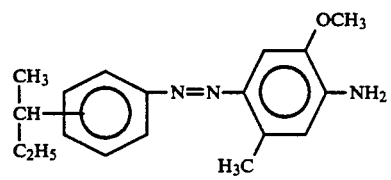

and then coupling with the following coupler (iv):

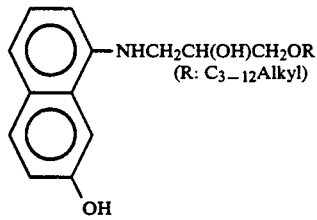

The azo dye of the present invention is obtained in the form of viscous oil which contains, as an indispensable chemical structure, a sec-butylphenyl azo group introduced by the diazotization of sec-butylaniline.

The azo dye of the present invention also contains a glycidyl ether reaction residue: —$CH_2CH(OH)CH_2OR$ and its solubility with alcohol type solvents is drastically improved.

The azo dye of the present invention is alternatively obtained by reacting a glycidyl ether with a mono- or disazo-dye which contains sec-butylphenylazo group and at least one active hydrogen containing group selected from an amino group and a carboxyl group.

The coupler components used in the synthesis of the liquid azo dye of the present invention are obtained by reacting a compound containing at least one active hydrogen containing group such as amino group or carboxyl group (for instance, 1-(3-aminophenyl)-3-methyl-5-pyrazolone, 1-phenyl-5-pyrazolone-3-carboxylic acid, 7-(tert-butyl)-2-hydroxy-3-naphthoic acid, 1-amino-7-naphthol) with a glycidyl ether (for instance, propyl glycidyl ether, butyl glycidyl ether, 2-ethylhexyl glycidyl ether, octyl glycidyl ether, dodecyl glycidyl ether) in the presence of basic catalyst (for instance, alkanol amine such as diethanolamine, triethanolamine, N-methyl-N,N-diethanolamine) at 80°-85° C. for more than 8 hours.

In the present invention, the coupler component used for the aforesaid reaction is used without isolating it from the reaction system but eliminating unreacted glycidyl ether and the catalyst by such means as water washing.

Since the azo dye of the present invention is obtained in the form of viscous oil, the reaction product is washed with hot water and after separation, it is dissolved in alcohol solvent, filtered and purified by thin film distillation. In the industrial practice, after washing the reaction product with hot water, it is dissolved in alcohol type solvent and in some cases it is filtered to obtain the final product in the form of concentrated (over 50 wt %) dye composition.

The present invention also provides an ink composition containing the liquid azo dye of the present invention or the concentrated azo dye composition of the present invention.

The liquid medium of the ink composition is mainly made of alcohols and/or glycols (including glycol ether or ester).

Examples of the alcohols and glycols are monovalent alcohol (for instance, alcohols such as ethanol, n-propanol, isopropanol, n-butanol, amyl alcohol, benzyl alcohol, cyclohexanol, diacetone alcohol, etc.; monoalkyl ether of glycols such as ethylene glycol monomethyl ether, ethylene glycol monoethyl ether, propylene glycol monoethyl ether, diethylene glycol monoethyl ether, diethylene glycol monobutyl ether, dipropylene glycol monoethyl ether, etc.; monoacetate of glycols such as ethylene glycol monoacetate, propylene glycol monoacetate etc.), divalent alcohol (for instance, glycols such as ethylene glycol, diethylene glycol, trimethylene glycol, trinethylene glycol, tetraethylene glycol, polyethylene glycol, propylene glycol, butane diol), and the like.

A hydrophyllic organic solvent such as methyl lactate, ethyl lactate, butyl lactate may be used with the above mentioned alcohol type solvent.

According to the present invention, an ink which has no environmental or hygienic problem can be obtained by using a mixture of low or no toxic alcohols such as ethanol, n-propanol, isopropanol, benzyl alcohol, ethylene glycol, phenyl glycol, propylene glycol monoalkyl ether and lactic acid ester.

The ink composition of the present invention is obtained by dissolving (e.g. under heating) 1-30 wt %, preferably 5-10 wt % of the liquid azo dye of the present invention into the liquid medium comprising 60-95 wt %, preferably 75-85 wt % of the aforesaid organic solvent and 5-15 wt %, preferably 8-12 wt % of a binder resin, based on the total weight of the ink composition and then filtering it. If necessary, small amount of additives such as nonionic surfactant, anticorrosive agent may be added.

A content of dye is not restricted, but varies according to the usage of the ink. Generally, it is 15-25 wt % for ball-point pens, 5-15 wt % for marking pens and 3-10 wt % for ink jet recording.

The binder resin for the ink composition of the present invention may be almost any kind of a resin which is soluble in alcohol. Examples of the resins are a low condensate of vinyl pyrrolidone, an alkyd resin, an acrylic resin, a phenolic resin, a styrene-maleic resin, a ketone resin, a rosin resin, etc.

The azo dye of the present invention contains sec-butylphenyl azo group and glycidyl ether reaction residue and has an excellent solubility in alcohols and glycols. The azo dye of the present invention may be prepared, upon necessity, as a concentrated alcohol dye composition and may be used for various oil ink.

The ink for writing utensils using the azo dye of the present invention is free from degeneration of deposition of dye due to change of environment such as temperature or humidity and it has an excellent time stability and fastness of written image when compared to the salt forming dye made of amines or basic dye.

The present invention provides a pollution-free ink using alcoholic solvent as the main ink solvent.

EXAMPLES

The present invention is described in further detail with reference to the Examples. These Examples should not be interpreted to restrict the present invention. In the Examples, "part" means part by weight and "mol" in the parenthesis is on 100% basis.

EXAMPLE 1

Synthesis of example dye (1)

According to the normal method, 30 parts (0.2 mol) of p-(sec-butyl)aniline was diazotized at 0° C.

Separately, 20 parts of diethanolamine was added to 38 parts (0.2 mol) of 1-(3-aminophenyl)-3-methyl-5-pyrazolone and 52 parts (0.4 mol) of butyl glycidyl ether and reacted at 80°-85° C. under stirring for 8 hrs. The obtained oily (resinous) reaction product was washed with hot water, dissolved by addition of sodium hydroxide and after making it an aqueous solution, the above obtained diazotizing liquid was added dropwise and the mixture was stirred for 3 hrs at 5°-15° C. The resulting oily product was washed with hot water (three times) and then dissolved in 200 parts of ethanol. After filtering, it was then purified by molecular distiller (Type 2-03 type thin film distiller manufactured by Shinko Faudler Co.) to obtain 80 parts of yellow liquid dye.

Figure 1:
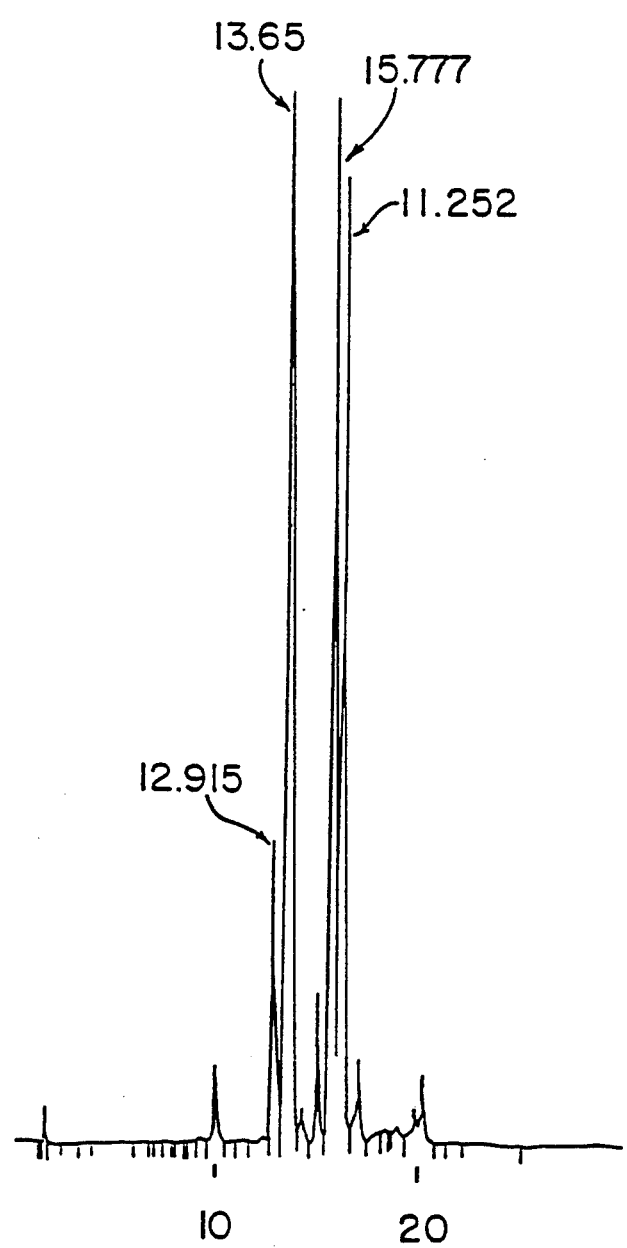
FIG. 1 is a diagram to show high speed liquid chromatogram of Example dye (1).

The results of analysis of the obtained liquid dye by high speed liquid chromatograph (HPLC) are shown in FIG. 1.

| (Analytical conditions of HPLC) | | | |
|---|---|---|---|
| Column; L-Column (φ4.6 mm × 150 mm) | | | |
| Carrier | | | |
| Mobile phase | | | |
| A liquid | | B liquid | |
| Dioxane | 60 ml | Dioxane | 90 ml |

| -continued | | | |
|---|---|---|---|
| Water | 40 ml | Water | 10 ml |
| Triethanol amine | 0.1 ml | Triethanol amine | 0.1 ml |
| Acetic acid | 0.3 ml | Acetic acid | 0.3 ml |

| Linear gradient condition | | | |
|---|---|---|---|
| Initial condition - | | Final condition | |
| A liquid | 80% | A liquid | 10% |
| B liquid | 20% | B liquid | 90% |
| Column temperature: 50° C. | | | |

Flow rate: 1.2 ml/min.
Detecting wavelength: 404 nm
Preparation of sample: 0.1 ml of liquid dye is dissolved in 10 ml of carrier B liquid to prepare the analytical test solution.

Analysis was made by using 5 μl of analytical test solution.

Figure 2:
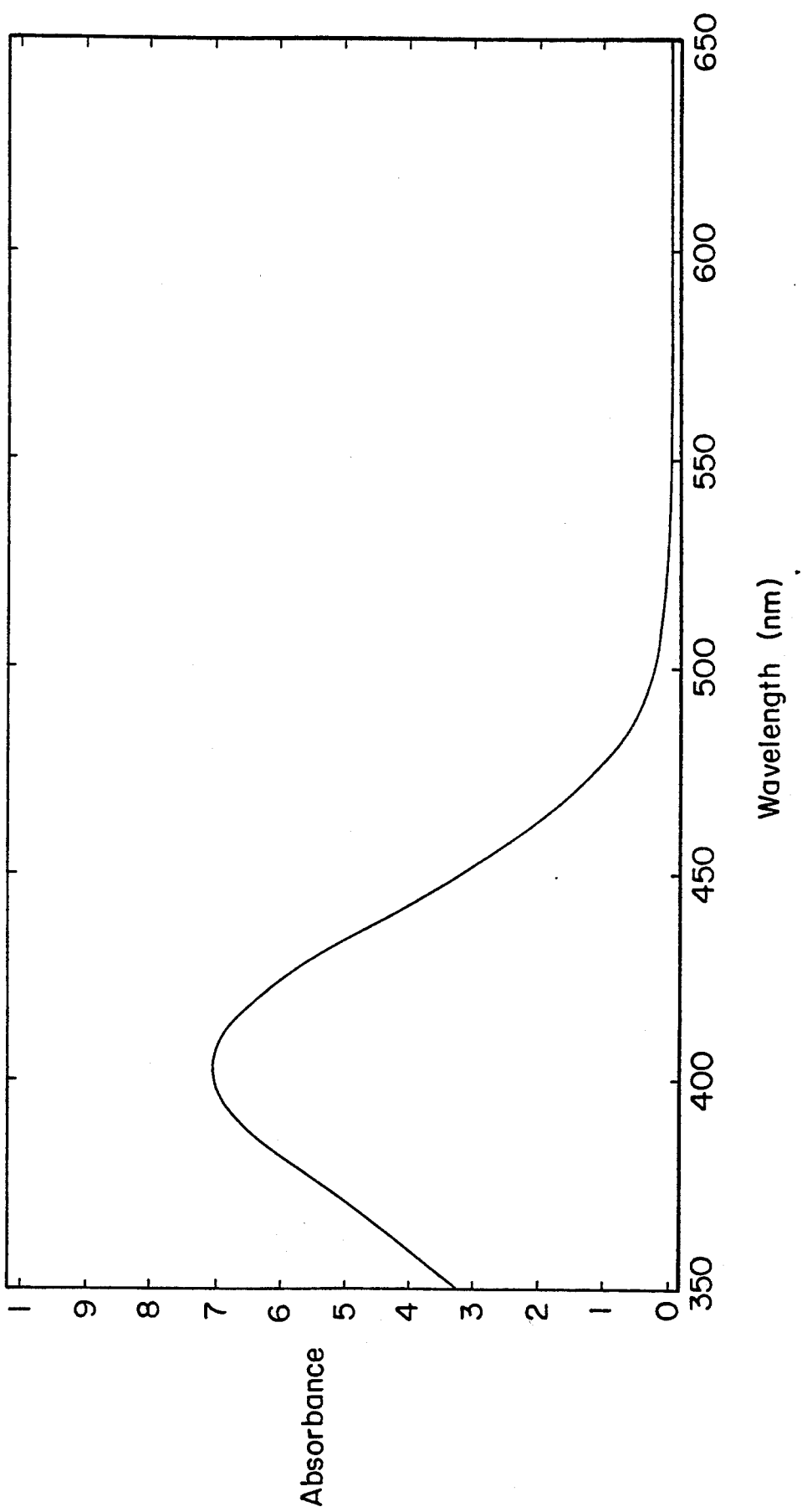
FIG. 2 is a diagram to show visible absorbance spectrum of Example dye (1).

Structural formula, color shade and maximum absorbance wavelength (λmax) of thus obtained dye are shown below. Visible absorbance spectrum (solvent: methanol) is shown in FIG. 2.

Example of dye (1): Yellow 404 nm

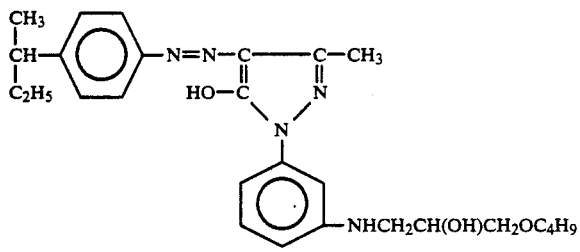

Example 2

Synthesis of example dye (2)

Except that 38 parts (0.2 mol) of 1-(3-aminophenyl)-3-methyl-5-pyrazolone was replaced for 69 parts (0.2 mol) of 1-phenyl-5-pyrazolone-3-carboxylic acid, the rest of the process was conducted in the same way as in Example 1 and the liquid dye indicated below was obtained.

Example dye (2): Yellow 402 nm

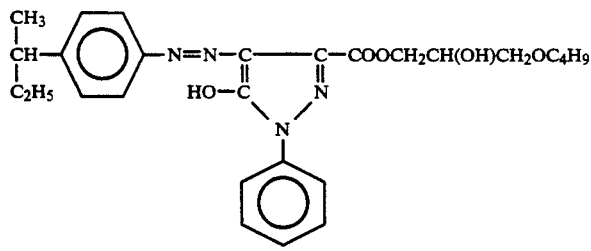

Example 3

Synthesis of example dye (3)

30 parts (0.2 mol) of p-(sec-butyl) aniline was diazotized at 0° C. according to the ordinary method.

Separately, 6 parts of diethanolamine was added to 50 parts (0.2 mol) of 7-(tert-butyl)-2-hydroxy-3-naphthoic acid and 52 parts (0.4 mol) of butyl glycidyl ether and the mixture was stirred at 80°–85° C. for 15 hrs. to cause reaction.

The obtained oily (resinous) reaction product was washed with hot water and dissolved by addition of sodium hydroxide and after making it into an aqueous solution, the above obtained diazotized liquid was added dropwise and the mixture was stirred for 3 hrs. at 5°–15° C. The obtained oily matter was washed with hot water (3 times) and dissolved in 300 parts of ethanol and after filtration, it was distilled by thin film distillation to obtain 90 parts of red liquid dye.

Figure 3:
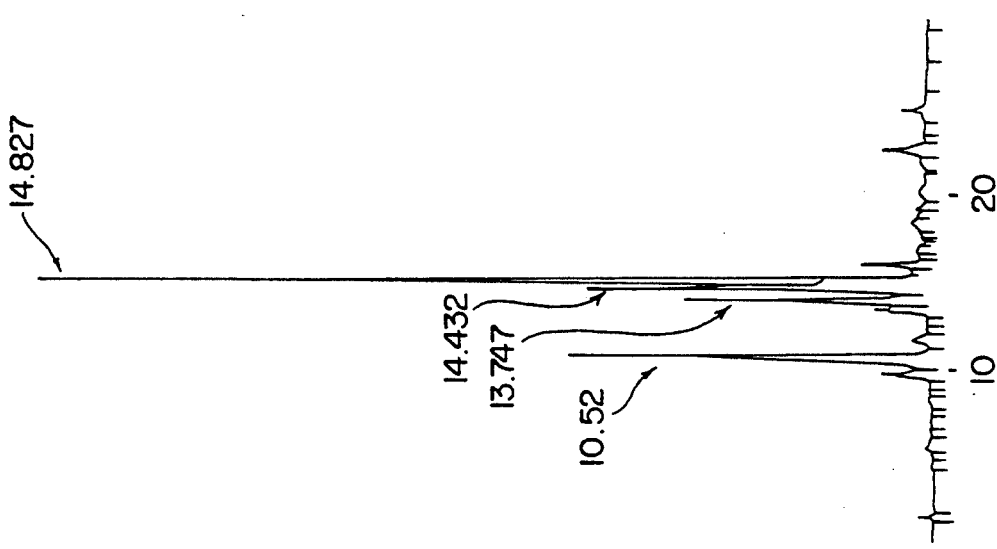
FIG. 3 is a diagram to show high speed liquid chromatogram of Example dye (3).

In the same manner as in Example 1, the product was analyzed by HPLC (detecting wavelength: 510 nm). The results are shown in FIG. 3.

Figure 4:
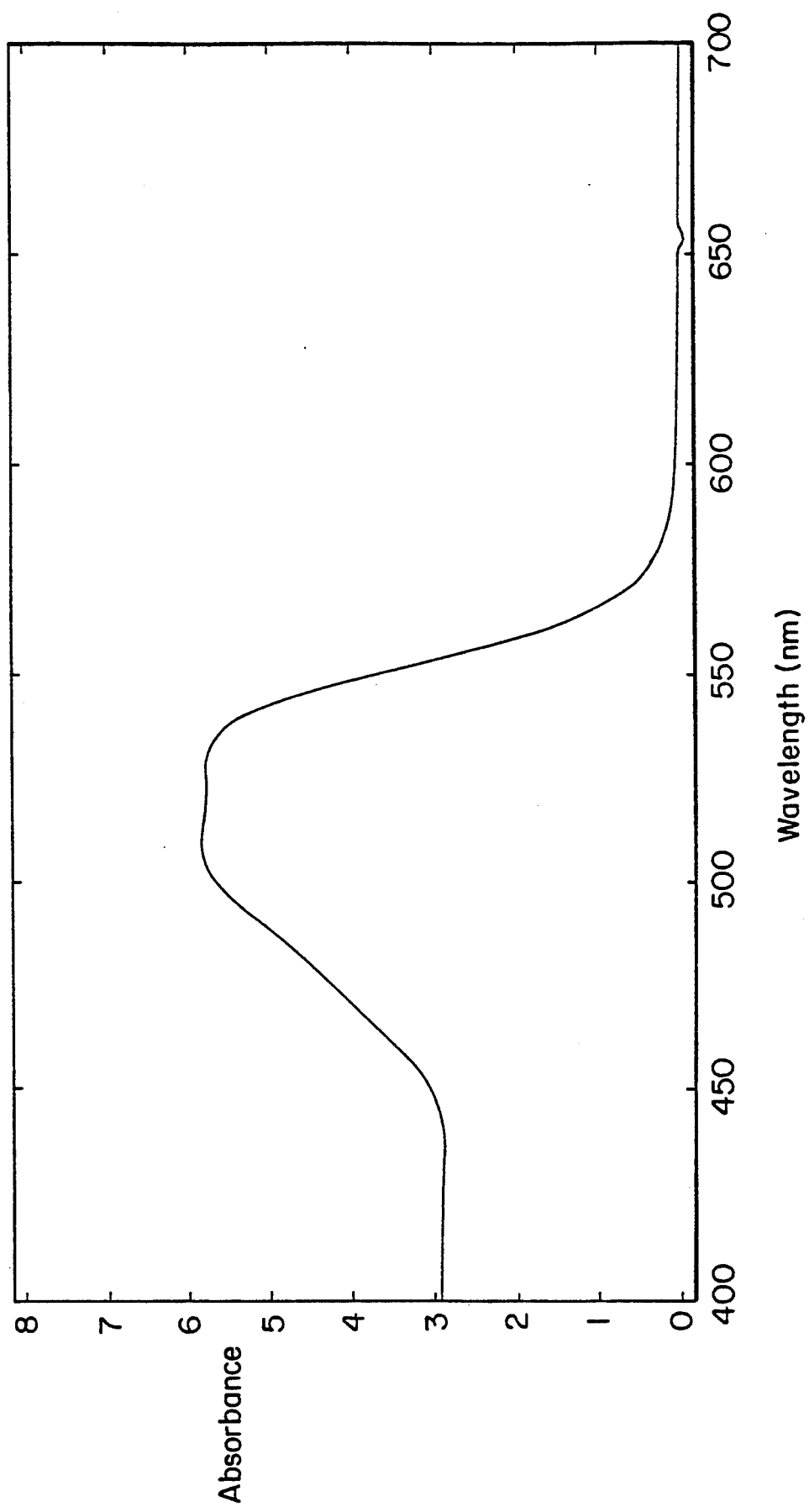
FIG. 4 is a diagram to show visible absorbance spectrum of Example dye (3).

Structural formula, color and maximum absorbance wavelength (λmax) of the obtained dye are shown below. Visible absorbance spectrum (solvent: methanol) of this dye is shown in FIG. 4.

Example of dye (3): Red 512 nm

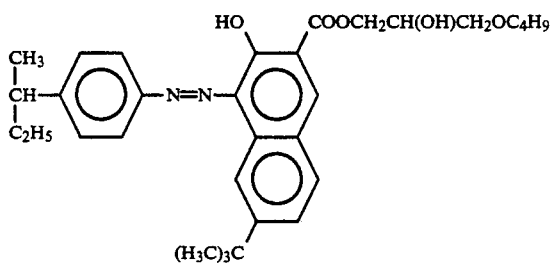

EXAMPLE 4

Synthesis of Example dye (4)

Except that 52 parts (0.4 mol) of butyl glycidyl ether was replaced for 75 parts (0.4 mol) of octyl glycidyl ether, the process was conducted in the same manner as in Example 3 and the liquid dye as shown below was obtained.

Example dye (4): Red 512 nm

Example dye (5): Purple 568 nm

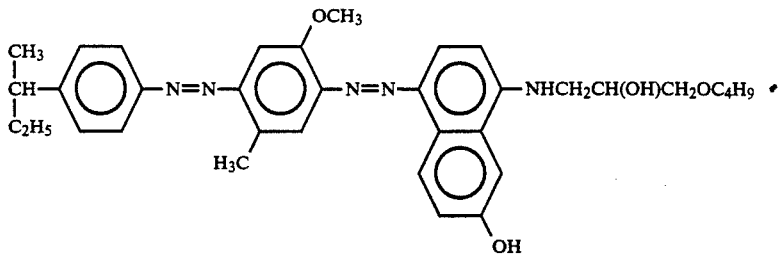

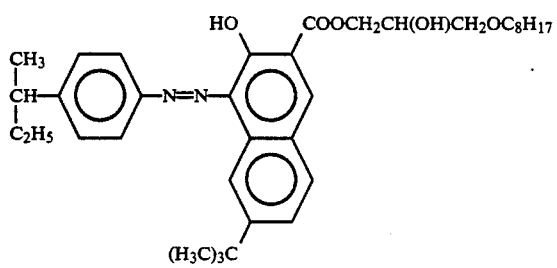

EXAMPLE 5

Synthesis of example dye (5)

30 parts (0.2 mol) of p-(sec-butyl)aniline was diazotized at 0° C. according to the ordinary method.

Separately, the diazotized liquid of sec-butylaniline was added dropwise in the aqueous hydrochloric acid solution of 28 parts (0.2 mol) of p-cresidine and it was subject to acid coupling at 0°-5° C. for 10 hrs. to obtain a monoazotized compound, followed by diazotization at 10°-15° C. by the ordinary method.

Separately, 5 parts of diethanolamine was added to 32 parts (0.2 mol) of 1-amino-7-naphthol and 52 parts (0.4 mol) of butyl glycidyl ether and stirred at 80°-85° C. for 16 hrs. to react. The resulting liquid reaction product was washed with hot water, sodium hydroxide was added thereto to make it alkali aqueous solution, the aforesaid monodiazo liquid was added thereto and the mixture was stirred at 5°-15° C. for 3 hrs. The resulting oily matter was washed with hot water (3 times) and it was dissolved in 200 parts of ethanol, the solution was filtered and the filtrate was subject to thin film distillation to obtain 70 parts of purple colored liquid dye.

Figure 5:
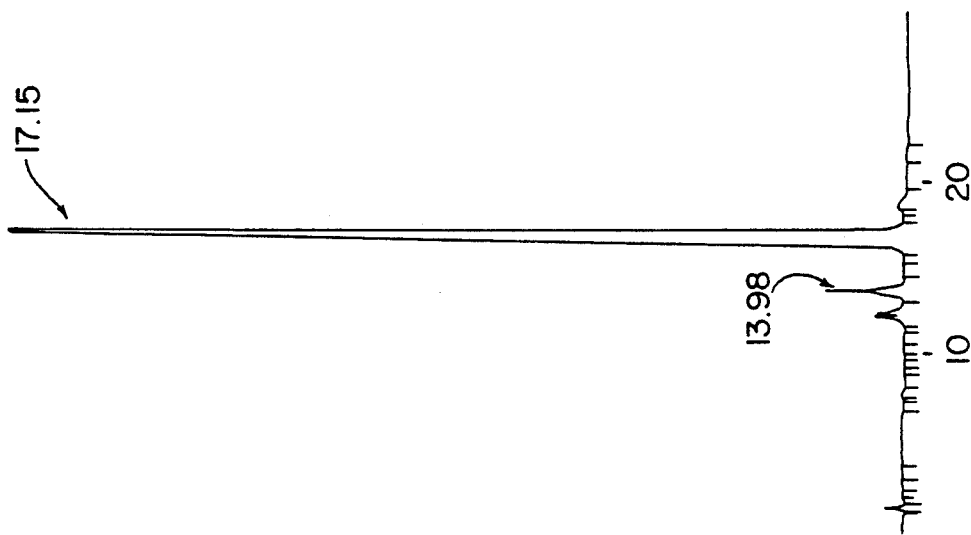
FIG. 5 is a diagram to show high speed liquid chromatogram of Example dye (5).

In the same way as in Example 1, the product was analyzed by HPLC analysis (detecting wavelength: 568 nm). The results are shown in FIG. 5.

Figure 6:
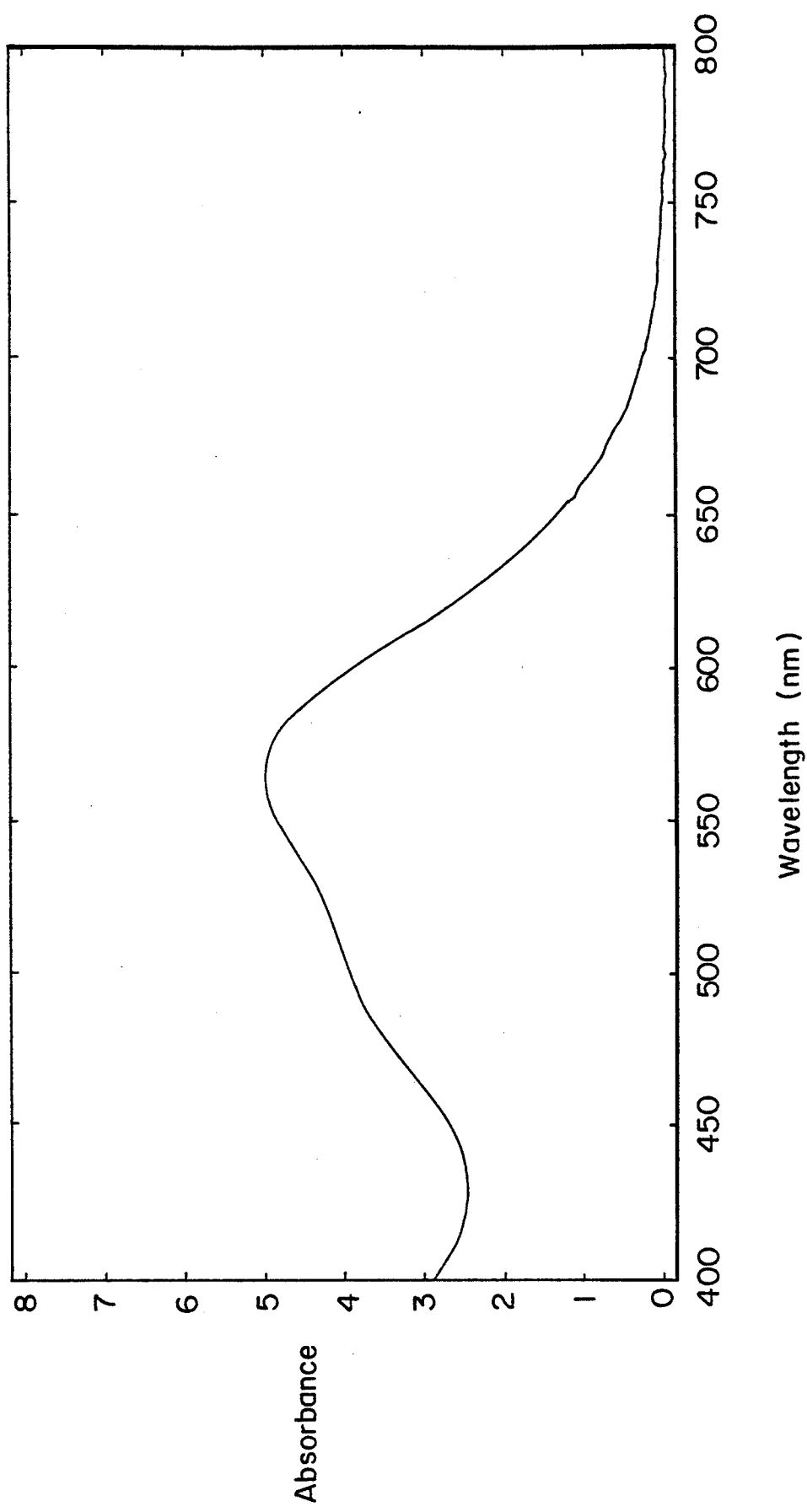
FIG. 6 is a diagram to shown visible absorbance spectrum of Example dye (5).

The structural formula, color shade and maximum absorbance wavelength (λmax) of the obtained dye is shown below. The visible absorbance spectrum (solvent: methanol) of this dye is shown in FIG. 6.

EXAMPLE 6

Synthesis of Example dye (6)

Except that 52 parts (0.4 mol) of butyl glycidyl ether was replaced for 97 parts (0.4 mol) of dodecyl glycidyl ether, the rest of the process was conducted in the same manner as in Example 5 and the liquid dye shown below was obtained.

Example dye (6) Purple 568 nm

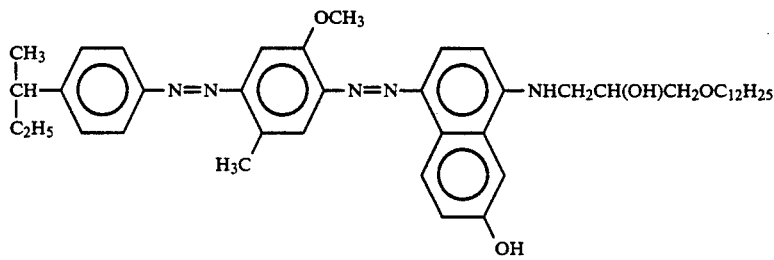

COMPARATIVE EXAMPLE 1

Japanese Kokai publication Sho 63-75068 discloses a dye composition which is soluble in alcohol and obtained by reacting the dye having active hydrogen containing group (for instance $NH_2$, COOH, OH) with an epoxy compound. For instance, the solubility of the azo dye (comparative example dye (1)) of the following structure in n-propyl alcohol was not more than around 30% (w/w).

Dye of comparative example (1): Yellow

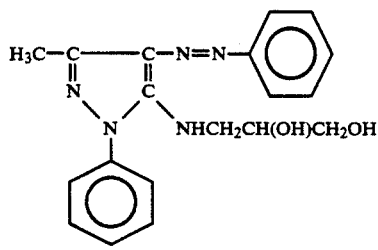

COMPARATIVE EXAMPLE 2

Japanese Kokai Publication Sho 55-99959 discloses an azo dye which employs long chain alkyl-substituted aniline for diazo component and a compound having a carboxylic group as the coupler. For instance, the azo dye of the following structure (comparative example dye (2)) little dissolves in lower alcohol type solvent and dissolves only by about 5% (w/w) in such solvent as ligroin, toluene and xylene.

Comparative example dye (2): Red

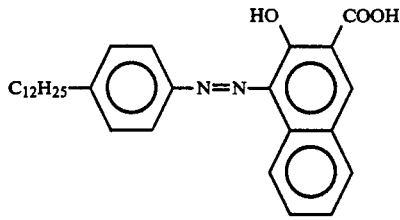

COMPARATIVE EXAMPLE 3

The solubility of the following salt-forming dye (comparative example dye (3)) of an acid dye and a basic dye with the glycol type solvent is fairly good but the stability with time of the ink made of it and water resistance of hologram are inferior.

Comparative example dye (3): Purple

Salt-forming dye of C.I. Acid Yellow 42 and Basic Violet

Solubility comparing test

Table 1 shows the solubility of the liquid dyes (Examples of dye (1)-(6)) and the dyes of Comparative Example 1-3 with alcoholic organic solvent.

The values shown in Table 1 are the solubility of the respective dye in each solvent in terms of wt %.

TABLE 1

| Dye No. | Ethanol | n-Propanol | Ethylene glycol | Mixture of phenyleneglycol/ benzyl alcohol/oleic acid = 4/1/1 |
|---|---|---|---|---|
| Ex. 1 | 50< | 50< | 50< | 50 |
| Ex. 2 | 50< | 50< | 50< | 50 |
| Ex. 3 | 50< | 50< | 50< | 50 |
| Ex. 4 | 50< | 50< | 50< | 50 |
| Ex. 5 | 50< | 50< | 50< | 50 |
| Ex. 6 | 50< | 50< | 50< | 50 |
| Comp. Ex. 1 | 10 | 30 | 30 | 30 |
| Comp. Ex. 2 | <1 | <1 | 20 | 20 |
| Comp. Ex. 1 | <1 | <1 | 10 | 30 |

Method of solubility test

The dye was added into 100 parts of the solvent while stirring it by magnet stirrer and spot it on a filter paper (Toyo Roshi No. 2) and a saturated concentration was investigated.

The sample which uses ethylene glycol or a mixed solvent was heated to 60°-70° C., to which the dye was added for determination of solubility.

Ink for alcohol marker pen

| Example A | |
|---|---|
| Example dye (1) | 7 parts |
| Ethanol | 68 parts |
| Benzyl alcohol | 5 parts |
| Ethyl lactate | 10 parts |
| Phenolic resin | 10 parts |

The above ingredients were uniformly mixed and dissolved at 40° C. to prepare an yellow ink. When stability with time of this ink was checked by low temperature/high temperature incubator (Tradename: INCUBATOR, manufactured by Sanyo Electric Co., Ltd.), deposition of dye and etc. and increase of viscosity of ink were not observed even in 3 months test (temperature range was −10°-50° C., repetition was made at every 60 minutes). Water resistance and light fastness of written image were good as shown in Table 2.

| Example B | |
|---|---|
| Example dye (3) | 8 parts |
| Ethanol | 59 parts |
| n-propanol | 10 parts |
| Benzyl alcohol | 5 parts |
| Ethyl lactate | 10 parts |
| Ketone resin | 10 parts |

When the above ingredients were uniformly mixed and dissolved at 60° C. and precisely filtered red ink was obtained. When stability with time was checked in the same way as in Example A, deposition of dye and etc. and increase of viscosity of ink were not observed. Water resistance and light fastness of written image were good as shown in Table 2.

| Example C | |
|---|---|
| Example dye (5) | 10 parts |
| Ethanol | 65 parts |
| Benzyl alcohol | 5 parts |
| Ethyl lactate | 10 parts |
| Phenolic resin | 10 parts |

The above ingredients were uniformly mixed and dissolved at 60° C. and precisely filtered to obtain a purple ink. When stability with time was checked, deposition of dye and etc. and increase of viscosity were not observed. Water resistance and light fastness of written image were good as shown in Table 1.

Oil ink for ball-point pens

| Example D | |
|---|---|
| Example dye (1) | 5 parts |
| Example dye (4) | 20 parts |
| Phenyl glycol | 39 parts |
| Benzyl alcohol | 9 parts |
| Activating agent*[1] | 5 parts |
| Polyvinyl pyrrolidone | 2 parts |
| Ketone resin*[2] | 20 parts |

*[1]Tradename: Prysurf P-208 manufactured by Dai-ichi Kogyo Seiyaku Co., Ltd.
*[2]Tradename: Hilac, manufactured by Hitachi Chemical Co.

The aforesaid ingredients were uniformly mixed and dissolved at 60° C. and precisely filtered to obtain a red ink. When stability with time was checked in the same manner as in Example A, deposition of dye and etc. and increase of viscosity were not observed. Water resistance and light fastness of written image good as shown in Table 2.

| Example E | |
|---|---|
| Example dye (2) | 5 parts |
| Example dye (5) | 30 parts |
| Phenyl glycol | 30 parts |
| Benzyl alcohol | 8 parts |
| Activating agent*[1] | 5 parts |
| Polyvinyl pyrrolidone | 2 parts |

-continued

| Example E | |
|---|---|
| Ketone resin*2 | 20 parts |

The above ingredients were uniformly mixed and dissolved at 60° C. and precisely filtered to obtain a black ink. When stability with time was checked in the same manner as in Example A, deposition of dye and etc. and increase of viscosity were not observed. Water resistance and light fastness of written image were good as shown in Table 2.

TABLE 2

| Example No. | Stability with time (−10° C./−10 to 50° C.) | Water resistance of written image | Light resistance of written image |
|---|---|---|---|
| Ex. A | Excellent/Excellent | Good | Good |
| Ex. B | Excellent/Excellent | Excellent | Good |
| Ex. C | Excellent/Excellent | Excellent | Good |
| Ex. D | Excellent/Excellent | Excellent | Good |
| Ex. E | Excellent/Excellent | Excellent | Good |

30 ml of ink was taken into a glass bottle and its stability was tested in a low temperature/high temperature incubator (Tradename: INCUBATOR, manufactured by Sanyo Electric Co., Ltd.) for 3 months and deposition of dye and etc. and increase of viscosity of ink were checked and evaluated.

Evaluation: : Excellent : Good
(Water resistance test/evaluation)

Ink was set in a pen and writing was made on a JIS P3201 (writing paper) and after 30 minutes writing, it was immersed in distilled water for 24 hrs., taken out and dried by air blow and written trace was checked and evaluated.

Evaluation: : Excellent : Good
(Light fastness test/evaluation)

Ink was set in a pen and writing was made on JIS P3201 (writing paper) and then it was irradiated by light for 5 hrs. in a Long Life Fade Meter (carbon arc type) and the written trace was observed and evaluated.

Evaluation: : Excellent : Good
Ink for Comparative Example (a)

Except that the example of the dye (3) of the present invention used in Example B was substituted by example of dye (2), a red ink was prepared in the same manner as in Example B. The obtained ink was not suitable for as alcohol marker pens.

Comparative Example (b)

Except that the example dye (5) of the present invention used in Example C was replaced by Comparative example dye (3), the process was conducted in the same manner as in Example C to obtain a purple ink. The obtained ink was unsuitable under the changing environment such as change of temperature and humidity and holograph with good water resistance was not obtained.

Comparative Example (c)

Except that the example dye (1) and (4) were replaced respectively by comparative example dye (1) and (2), the process was made in the same manner as in Example D to prepare red ink. The obtained ink was unsuitable for the oil ink for ball-point pens.

What is claimed is:
1. A liquid azo dye represented by the formula:

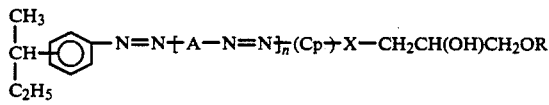

(wherein, A stands for a phenylene group which may have a substituent, n is o or 1, Cp is a pyrazolone derivative residue or a naphthol derivative residue, X is —NH— or —COO— and R is an alkyl group having 3 to 12 carbon atoms).

2. The liquid azo dye represented by the formula:

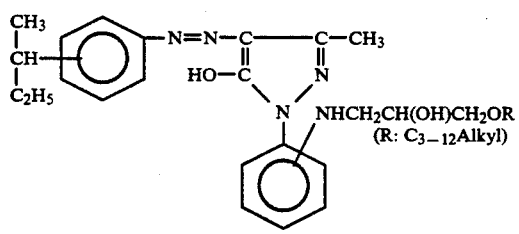

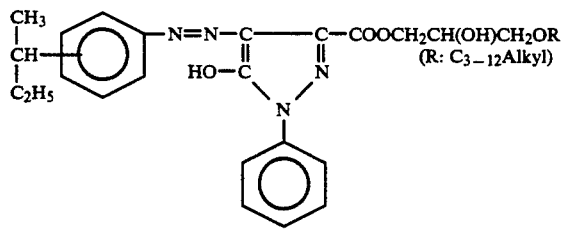

-continued

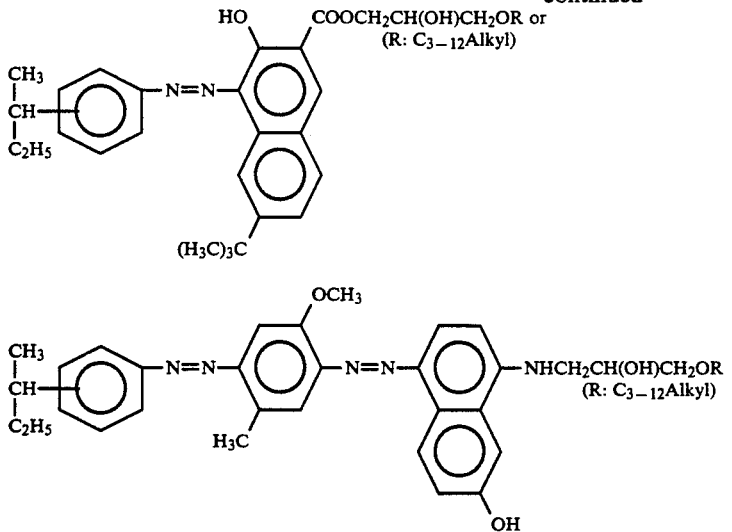

3. A dye composition comprising:
(a) the liquid azo dye according to claim 1
(b) a solvent selected from the group consisting of alcohols, glycols and mixtures thereof; the liquid azo dye being present in an amount of 50% by weight or more.

4. An ink composition comprising the liquid azo dye according to claim 1.

5. An ink composition comprising the dye composition according to claim 3.

* * * * *